W. L. TETER.

PROCESS OF AND APPARATUS FOR CLEANING GRAIN.

No. 10,275. Reissued Jan. 23, 1883.

WITNESSES:

Harry Drury

David Williams

INVENTOR:

William L. Teter

By his Attys.

Howson and Sons

UNITED STATES PATENT OFFICE.

WILLIAM L. TETER, OF PHILADELPHIA, PENNSYLVANIA.

PROCESS OF AND APPARATUS FOR CLEANING GRAIN.

SPECIFICATION forming part of Reissued Letters Patent No. 10,275, dated January 23, 1883.

Original No. 262,505, dated August 8, 1882. Application for reissue filed December 14, 1882.

*To all whom it may concern:*

Be it known that I, WILLIAM L. TETER, of Philadelphia, Pennsylvania, have invented an Improvement in Processes of and Apparatus for Cleaning Grain, of which the following is a specification.

My invention has reference to processes and apparatus adapted to clean grain, but more particularly to those processes known as "decorticating processes;" and it consists mainly in subjecting the grain to dry heat, and in a heated condition treating it in an attrition-machine to friction and air-currents; also, in subjecting the grain to treatment in a polishing or finishing machine and to air-currents, and also to a drier, which completely dries the cleaned or decorticated grain before passing to the burr-stones; and, finally, in the construction of apparatus for carrying the process into effect, all of which is more fully set forth in the following specification, shown in the accompanying drawings and pointed out in the appended claims.

The object of my invention is to effectually cleanse wheat and other grains by removing the outer cuticles.

Figure 1:
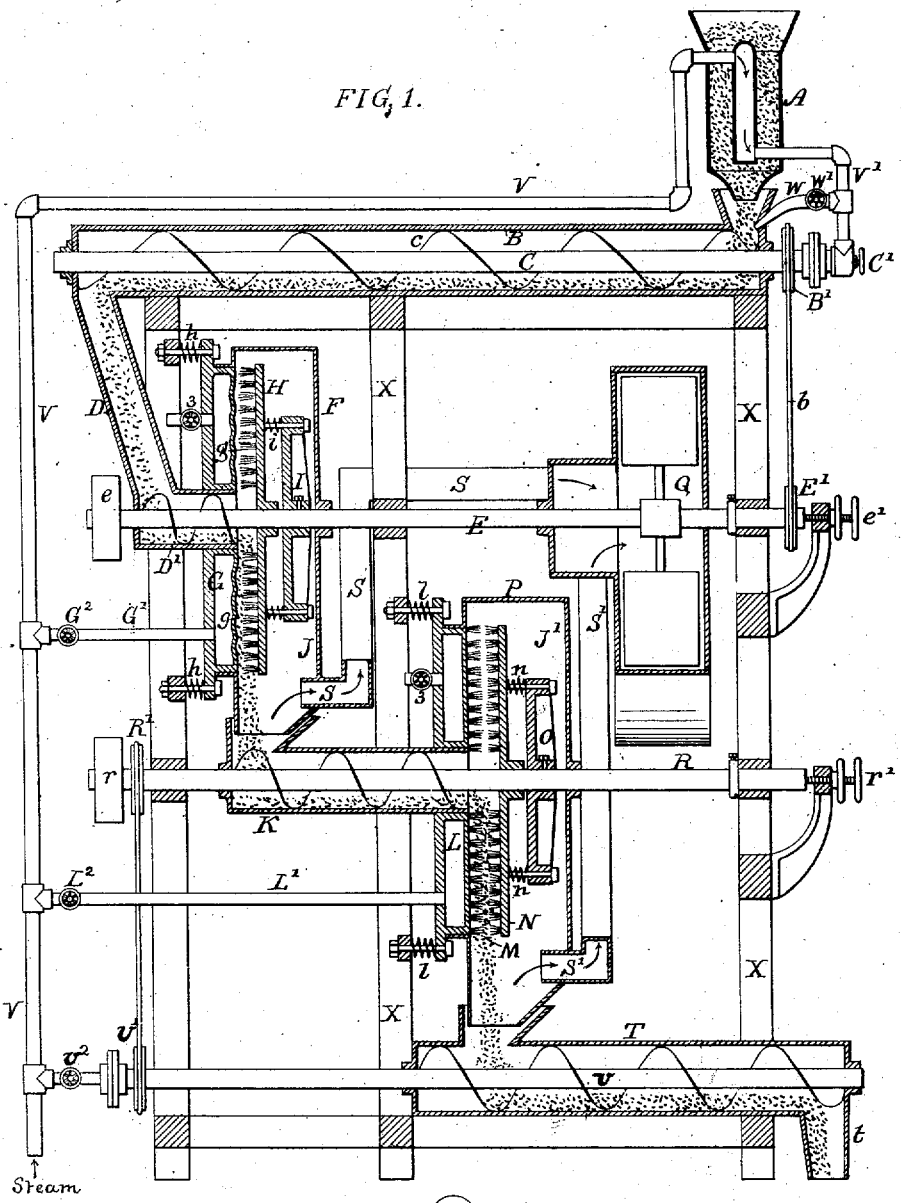
Figure 2:
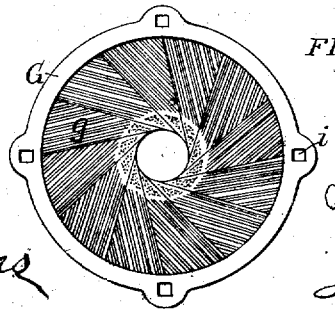

In the drawings, Figure 1 is a sectional elevation of my improved grain-cleaning machine, and Fig. 2 is a view of the attrition-surface.

A is a heater for imparting dry heat to the grain.

B is a conveyer, having a feeding-screw, *c*, and a hollow steam-heated shaft, C.

D is a chute from the conveyer to the attrition-machine F.

E is the attrition-machine shaft, and is provided with a pulley, *e*.

D′ is a conveyer to feed the grain into the eye of the attrition-surface *g*, which is heated by steam introduced into the box G through a steam-pipe, G′, provided with a valve, $G^2$.

H is an attrition-brush.

I is a driving-disk secured to shaft E, and *i* are springs between the brush H and the driving-disk. The box G is also set on springs *h*, and carries a casing, J, adapted to surround it on all sides, and inclosing the brush H and driving-disk.

P is a finishing-machine, consisting of a box, L, for steam, similar to box G, only instead of the surface *g* it is provided with brushes M. This box L is set upon springs *l*, and steam is admitted to it by steam-pipe L′, and the supply is governed by valve $L^2$. The steam-pipes G′ and L′ may work loosely in the boxes G and L to allow the latter some slight play; or they may be rigidly secured to these boxes and provided with any well-known joints. The steam which enters the boxes G and L escapes therefrom by exhaust-pipes 3.

The casing J is provided with an opening or spout at the bottom, which discharges into the conveyer K on shaft R, which is adapted to feed the grain into the eye of the box L. The shaft R is supported in suitable bearings, is provided with a pulley, *r*, and carries a driving-disk, O. Fitting loosely upon the shaft R, and adapted to slide thereon, is the brush-disk N, between which and the disk O are the springs *n*. The casing J′ is similar to casing J, and surrounds both brushes, and discharges the cleaned grain into a drying conveyer or heater, T, having a hollow axle, U, the admission of steam to which is governed by the valve $U^2$. The cleaned and dried grain is directed by a spout, *t*, to the burr-stones to be ground. The shafts E and R can be moved endwise by adjusting-screws *e′* and *r′*, so as to bring the attrition or friction brushes nearer to or farther from the stationary friction-surfaces.

Upon either shaft E or R is a suction-fan, Q, which causes the removed cuticles to pass from the casings J and J′ through the tubes S and S′. The conveyer-shaft U is driven from shaft R by a band passing over pulleys R′ and U′, and the conveyer-shaft C is rotated by a band, *b*, passing over pulleys B′ and E′. Steam is supplied to pipes U L′ G′, heater A, and conveyer C by pipes V and V′, and the supply of steam to the upper conveyer is governed by valve C′. A steam-pipe, W, provided with a valve, W′, admits steam from pipe V′ to the grain in the conveyer, but is only used when there is not sufficient moisture in the grain. The boxes G and L with their casings are stationary, while the brushes H and N rotate.

The operation is as follows: The grain is fed in the cold state into the heater A, the dry heat thus imparted to it bringing the moisture from the inside to the surface, and thereby loosening the outer cuticles of the grain. It is then passed into the conveyer B, where it is subjected to further dry heat from the steam-heated pipe or axle C. If the grain is very dry, a little steam is admitted to it by pipe W; but in practice this is very seldom used. The grain in its heated and externally-moistened condition passes down chute D into the conveyer D′, and is subjected to the action of the attrition-surface *g* and the spring-brush H, where it undergoes a rough treatment to rub off the cuticles of the grain, which have been loosened by the action of the dry heat on the internal moisture of the berries, and, to still further insure the removal of the cuticles, the attrition-surface is heated by steam in box G. The attrition-surface *g* is grooved somewhat similar to a millstone, as shown in Fig. 2; but it may be varied, as desired. As the product falls the removed cuticles pass through the tube S to fan Q, and the grain passes to conveyer K, by which it is fed to the finishing-machine, and passes between the two stiff brushes N and M, one only of which revolves, and, after undergoing a severe brushing action, is discharged into the conveyer T, where it is dried thoroughly by the steam-heated pipe or axle U before it passes through the spout *t*. As the grain in its cleaned condition and coatings pass down the casing J′ to the conveyer T, the light particles brushed from the grain pass through the tube S′ to the fan Q.

By the foregoing construction the apparatus is made in a condensed form and adapted to treat the grain in a continuous manner.

There is a current of air in the direction of the arrow through the lower portion of the casing J, owing to the action of the fan, and the cleansed grain-berries as they fall are subjected to the drying influences of this current. The same thing takes place when the grain-berries fall from the finishing-brushes.

The object of the springs *h* and *i* is to permit both the box G and brush H to yield slightly and accommodate themselves to each other, and the same remarks will apply to the springs appertaining to the box L and brush N.

I do not limit myself to the precise construction herein shown, as it may be varied in many ways without departing from my invention; yet I prefer this construction to all others.

Having now described my invention, what I claim as new, and desire to secure by Letters Patent, is—

1. The process herein described of cleaning grain, the said process consisting in first subjecting the grain to heat without moisture for a sufficient length of time to draw the internal moisture of the berries to the surface, and thereby loosen the cuticles, and, second, subjecting the grain thus treated to attrition and air-currents, substantially as set forth.

2. The herein-described process of cleaning grain, which consists in first heating said grain without moistening it to draw the internal moisture to the surface, then treating it to friction or attrition and air-currents to remove the cuticle, and then thoroughly heating the cleaned grain with dry heat, as specified.

3. The process described of cleaning grain, the said process consisting in first subjecting the grain to dry heat, and thereby causing the internal moisture to seek the surface and loosen the cuticle; second, subjecting the grain to attrition and air-currents; and, third, brushing the grain and again subjecting it to air-currents, all substantially as described.

4. The herein-described process of cleaning grain, which consists in the following steps, to wit: first, heating the grain with dry heat, then slightly moistening it, then subjecting it to the combined action of dry heat, attrition, and currents of air, then subjecting it to dry heat, brushing, and air-currents, and, finally, heating it, substantially as specified.

5. The combination, substantially as described, of the heater A, for imparting dry heat, the steam-heated conveyer B C *c*, the attrition-machine, and an exhaust-fan.

6. The combination of the heater A, for imparting dry heat, the steam-heated conveyer B C *c*, the attrition-machine, the finishing-machine, and the exhaust-fan, substantially as set forth.

7. The combination of heater A, conveyer B, with its steam-axle C, conveyer D′, attrition-surface *g*, and its steam-box G, brush H, casing J, fan Q, and pipe S, as described.

8. The combination of a box having an attrition-surface with a shaft, E, having a driving-disk, I, a brush, H, which can slide on, but turns with, the shaft, and springs interposed between the brush and driving-disk, substantially as set forth.

9. The combination of heater A, conveyer B, steam-pipe W, and attrition-machine F, substantially as described.

In testimony whereof I have signed my name to this specification in the presence of two subscribing witnesses.

WILLIAM L. TETER.

Witnesses:
HARRY DRURY,
HARRY SMITH.